United States Patent [19]
Lund

[11] Patent Number: 5,277,219
[45] Date of Patent: Jan. 11, 1994

[54] HOT WATER DEMAND SYSTEM SUITABLE FOR RETROFIT

[75] Inventor: William J. Lund, Stockton, Calif.
[73] Assignee: Metlund Enterprises, Stockton, Calif.
[21] Appl. No.: 695,609
[22] Filed: May 3, 1991
[51] Int. Cl.$^5$ .............................................. F04B 49/00
[52] U.S. Cl. .................................. 137/337; 126/362; 417/12
[58] Field of Search .................. 126/362; 137/337; 417/12

[56] References Cited

U.S. PATENT DOCUMENTS

| | | | |
|---|---|---|---|
| 1,635,745 | 7/1927 | Ellis | 137/337 |
| 3,776,261 | 12/1973 | Houghton | 137/337 |
| 4,142,515 | 3/1979 | Skaats | 417/12 |
| 4,201,518 | 5/1980 | Stevenson | 417/12 |
| 4,606,325 | 8/1986 | Lujan, Jr. | 126/362 |

Primary Examiner—A. Michael Chambers
Attorney, Agent, or Firm—Walter A. Hackler

[57] ABSTRACT

A hot water recovery system includes a hot water source; a hot water delivery line connected between said hot water source and at least one plumbing fixture along with a cold water delivery line connection between said plumbing fixture, a cold water source and said hot water source; a pump, interconnected between said hot and cold water delivery lines, enables circulation of water from the hot water delivery line through the cold water delivery line and into the hot water source, thus eliminating the need for a separate recirculation system. A control system causes the pump to circulate water from the hot water line into the cold water line and back to the hot water source when a hot water valve on said plumbing fixture is turned on; and a temperature sensor stops the pump, via the control system, to prevent heated water from being circulated through the cold water delivery lines.

14 Claims, 1 Drawing Sheet

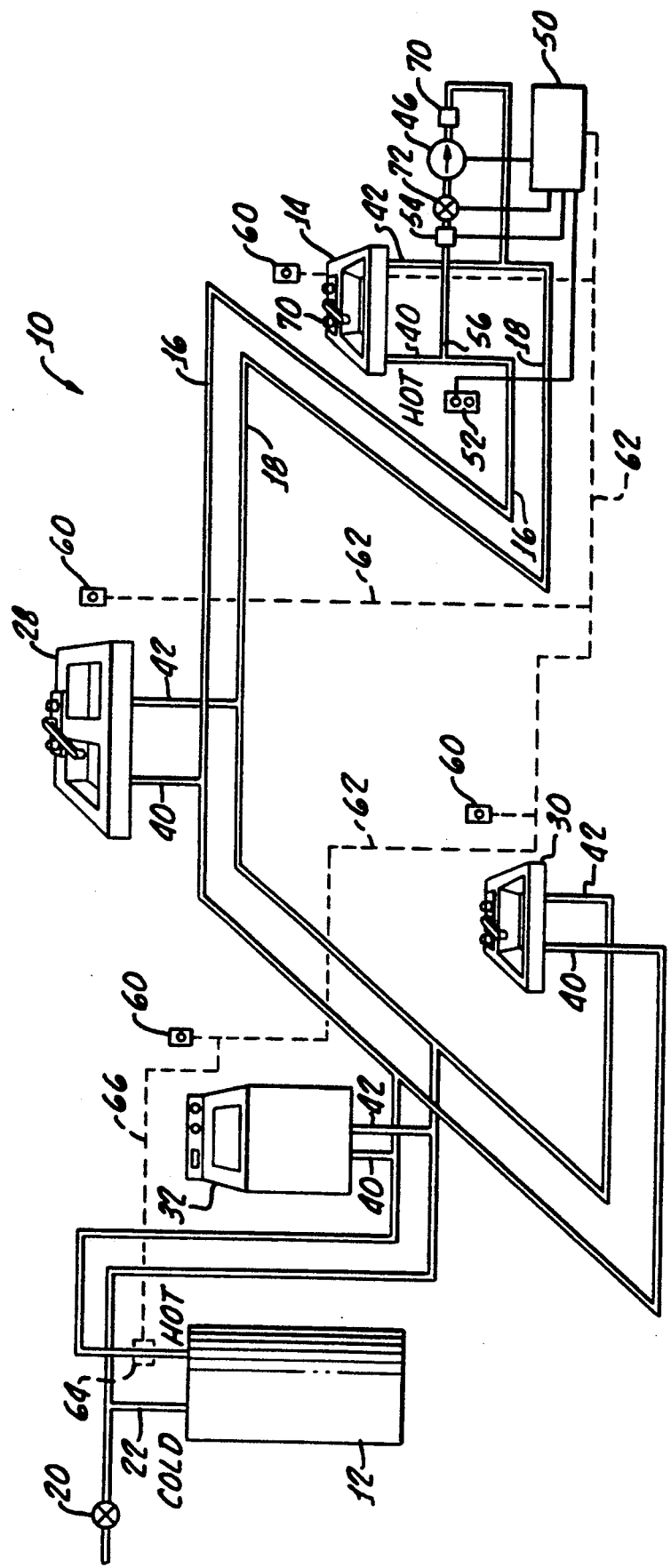

HOT WATER DEMAND SYSTEM SUITABLE FOR RETROFIT

The present invention is generally directed to plumbing systems and more particularly directed to plumbing systems of high thermal efficiency.

As described in U.S. Pat. Nos. 4,321,943 and 4,798,224, a considerable amount of thermal energy may be wastefully dissipated from hot water lines which provide hot water to plumbing fixtures, such as domestic wash basins, dishwashers and clothes washers. In addition, if water is allowed to run down the drain while waiting for hot water to be delivered to the fixture from a remote hot water source, a substantial water loss may occur.

In order to reduce such water loss, plumbing systems have been devised which continuously circulate hot water from a hot water source to the fixture and back to the hot water source. In this arrangement, a supply of hot water is always adjacent to a plumbing fixture despite the remote position of the hot water source. The water loss is then limited to the amount of cold water disposed in draw pipes interconnecting the plumbing fixture to the hot water conduit in which hot water is circulated.

While this system substantially reduces the amount of water which must be withdrawn from the fixture before suitable hot water is obtained, it is not energy efficient because the array of pipes interconnecting the plumbing fixtures in the hot water source provide an enormous surface area for thermal radiation therefrom. In addition, the electrical cost of running a circulating pump may cause such system to be prohibitive in view of the latest energy conscious code requirements of most governmental agencies.

Thermal losses in both circulating and noncirculating plumbing systems have been reduced by insulation of the hot water lines as well as the hot water heaters which feed the plumbing fixtures. While such insulation slows the dissipation of heat, no savings occur over an extended period of time in noncirculating systems because intermittent use of hot water through the lines still allows hot water to cool to ambient temperatures. In circulating systems, of course, there is a continual thermal loss.

With specific reference to noncirculating systems, devices have been developed to actually recover the hot water remaining in the hot water lines after the use of a fixture by drawing the hot water back into the hot water tank; e.g., see U.S. Pat. Nos. 4,321,943 and 4,798,224. Because hot water is removed from the lines, there is an actual reduction in the amount of heat loss rather than just a slowing of heat loss as occurs through the use of insulation alone.

U.S. patent application Ser. No. 562,894, now U.S. Pat. No. 5,042,524, is directed to an accelerated hot water delivery system which substantially reduces thermal losses by providing intermittent circulation through the hot water lines.

The present invention utilizes the cold water line as a return line for a hot water loop. This enables the present invention to be readily retrofitted into existing homes without the need for the installation of a return line to the hot water heater. Hence, substantial installation costs are eliminated.

SUMMARY OF THE INVENTION

A hot water delivery system in accordance with the present invention generally includes a hot water source and hot water delivery lines connected between the hot water source and at least one plumbing fixture. A cold water delivery line is provided and connected between the plumbing fixture and a cold water source and the hot water source for delivering cold water thereto.

Pump means are provided which are interconnected between the hot and cold water delivery lines, for circulation of the water from the hot water delivery line through the cold water delivery and into the hot water source. A control system provides means for causing the pump to circulate water from the hot water line into the cold water line and back to the hot water source when a hot water valve on the fixture is turned on.

A temperature sensor, connected to the control system, provides a means for causing the control system to stop the pump to prevent heated water from being circulated to the cold water delivery lines.

In this manner, the cold water delivery lines are used as a return loop for water to the hot water source, which eliminates the need for installation of a separate return line as is common in circulating water systems. Hence, the apparatus of the present invention may be readily installed adjacent to one plumbing fixture in an existing system without the installation of additional plumbing return lines which requires substantial modification to an existing plumbing system, entailing the removal of wallboard and/or plaster for installation within walls and cutting into concrete foundation slabs.

In one embodiment of the present invention, manual switches may be provided and connected to the control means to provide a means for causing the control means to turn on the pump, whereas in another embodiment of the present invention, a flow detector may be installed in the hot water delivery line and connected to the control means for automatically causing the control system to turn on the pump.

The temperature sensor in one embodiment of the present invention may be disposed in a water line connecting the hot water delivery line to the pump and may be configured for detecting a selected water temperature and in response thereto, causing the control system to stop the pump. Alternatively, the temperature sensor may be adapted for detecting a temperature increase, or gradient, and a response thereto causing the control system to stop the pump.

BRIEF DESCRIPTION OF THE DRAWINGS

The advantages and features of the present invention will appear from the following description when considered in conjunction with the accompanying drawing, in which:

FIG. 1 is a flow diagram of a plumbing system in accordance with the present invention, generally showing hot water source and conduit means, in communication with at least one plumbing fixture, along with a pump, flow switch, and a controller.

DETAILED DESCRIPTION OF THE DRAWINGS

Turning now to FIG. 1, there is shown a hot water recovery system 10 which generally includes a hot water source 12, such as a gas or electric hot water heater, connected to a plumbing fixture such as a sink 14 by a hot water delivery line 16. It is to be appreciated that the hot water source 12 may be a conventional heater 12 as shown or an apparatus as described in U.S. Pat. No. 4,798,224, entitled "Automatic Hot Water Recovery System," or that shown in U.S. patent application Ser. No. 562,894, now U.S. Pat. No. 5,042,524, entitled "Demand Recovery System". Also provided in the conventional manner is a cold water delivery line 18 interconnecting the sink 14 with a cold water source 20 which is also interconnected with the hot water source 12 via a feed line 22.

Optional plumbing fixtures such as sinks 28, 30 and washing machine 32 may be provided along with any other common plumbing fixture utilized in residences and businesses, all such fixtures being connected in a parallel configuration with the hot water delivery line 16 and cold water delivery line 18 by feed lines 40 and 42, respectively. At a selected plumbing fixture, such as the sink 14 which is most remote from the hot water source 12, a pump 46 is interconnected between the hot water delivery line 16 and the cold water delivery line 18 via the feed lines 40 42 respectively. The pump provides means for circulating water from the hot water delivery line 16 through the cold water delivery line 18 and back into the hot water source 12 via line 22, by utilizing the cold water delivery line as a return feeder to the hot water source 12. No separate circulation line need be implemented in new systems. In order for the pump 46 to effect flow in a reverse manner through the cold water delivery line 18 and into the hot water tank 12, the pump 46 must, of course, develop sufficient head to overcome existing water pressure in the line.

The hot water delivery system 10 of the present invention can be used in conjunction with an existing system, which may include the hot water source 12, hot and cold water delivery lines 16 18, and a plumbing fixture 14. In this instance, the pump 46 and controller 50, to be described hereinafter in greater detail may be installed approximately fixture 14 without disturbing the remainder of the existing plumbing system. The advantages of this embodiment are significant in that no unwanted disruption of the housing or business structure is needed in order to implement the hot water recovery system in accordance with the present invention.

The control system 50, which may be of any common electrical type employing relays or solid state electronics or microchips, provides a means for switching electrical current outlet 52 to the pump 46 in order to cause the pump 46 to circulate water from the hot water line 16 to the cold water line 18.

A temperature sensor 54 is disposed in a line 56 interconnecting the pump 46 with the hot water delivery line 16 through the feeder 40, providing means for causing the control means to stop the pump 46 to prevent heated water from being circulated through the cold water delivery line 18 as will be hereinafter described. The temperature sensor 54 may be of a conventional type inserted into the line 56 for water flow thereover, or it may be a thermistor type of detector strapped to the outside of the line 56. The sensor 54 may be of a type for detecting a selected water temperature and in response thereto causing the control system to stop the pump 46.

However, it has been found that the sensitivity of such sensors may not be sufficient to prevent unwanted hot water from entering the cold water delivery line 18. Thus, the preferred embodiment of the present invention is a temperature sensor 54 which is configured for detecting a temperature increase, or gradient, such as one or two degrees and in response thereto, causing the control system 52 stop 46. Thus, no matter what the actual temperature of the water in the line 56 is, an increase of one or two degrees will cause the pump 46 to stop. The pump 46 is started through the control system 50 by means of optional manual switches 60 electrically connected to the control system 50 by way of wires 62 for causing the control system to turn on the pump 46, the control system in this manner acting as a relay switch. Alternatively, to reduce electrical wiring costs, a flow detector 64 may be disposed in the hot water delivery line 18 at any position and connected to the control system by an electrical wire 66 for causing the control system 52 to turn on the pump 46 in response to a detection of a water flow in the hot water delivery line 18.

Although the flow detector 64 is shown adjacent to the hot water source 12, it may be alternatively disposed in the line 40 beneath the fixture 14 for reducing the electrical interconnection required and for enabling all of the apparatus of the present invention to be disposed beneath the fixture 14. Either the manual switches 60 or flow detector 64 enables the control means 52 to turn on the pump 46 when a hot water valve 70 on the fixture 14 is turned on, thus causing a flow in the hot water delivery line 18.

It should be appreciated that if the pump 46 is not a positive displacement type which does not allow water to flow in a reverse manner through it, then a one-way valve 70 should be provided to prevent such flow and preferably a solenoid 72, controlled by the control system 50, should be inserted upstream of the pump 46 to prevent water flow through the pump 46 when the control system 50 turns off pump 46.

It should also be appreciated that the temperature sensor 52 should be disposed in the hot water line or attached to it as hereinbefore described to prevent a rescission between the hot water delivery line 16 and the cold water delivery line 18. However, the pump can be located anywhere throughout the system 10 between the hot water delivery line 16 and cold water delivery line 18. Although there has been hereinabove described a particular arrangement of a hot water recovery system in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A hot water recovery system comprising:
 a hot water source;
 a hot water delivery line connected between said hot water source and at least one plumbing fixture;
 a cold water delivery line connection between said plumbing fixture, a cold water source and said hot water source;
 pump means, interconnected between said hot and cold water delivery lines, at a point remote from said hot water source, for circulation of water from the hot water delivery line through the cold water delivery line and into the hot water source;
 control means for causing the pump means to circulate water from the hot water line into the cold water line proximate said plumbing fixture and back to the hot water source when a hot water valve on said plumbing fixture is turned on; and temperature sensor means, connected to said control means for causing said control means to stop the pump means to prevent heated water from being circulated through the cold water delivery line.

2. The hot water recovery system according to claim 1 further comprising manual switch means, connected to said control means, for causing the control means to turn on the pump means.

3. The hot water recovery system according to claim 1 further comprising flow detection means, disposed in said hot water delivery line and connected to said control means, for causing the control means to turn on the pump means.

4. The hot water recovery system according to claim 1 wherein said temperature sensor means is disposed in a water line connecting the hot water delivery line and the pump means.

5. The hot water recovery system according to claim 4 wherein said temperature sensor means comprises means for detecting a selected water temperature and in response thereto causing the control means to stop the pump means.

6. The hot water recovery system according to claim 4 wherein said temperature sensor means comprises means for detecting a temperature increase and in response thereto causing the control means to stop the pump means.

7. The hot water recovery system according to claim 6 wherein said pump means comprises a positive displacement pump for preventing backflow therethrough when the pump means is stopped.

8. A hot water recovery system for a plumbing system having separate hot water and cold water delivery lines connected to at least one plumbing fixture, said hot water delivery line being connected to a hot water source disposed remotely from the plumbing fixture and said cold water delivery line being connected to a cold water source and said hot water source said hot water recovery system comprising:

pump means, adapted for interconnection between said hot and cold water delivery lines, at a point remote from said hot water source, for circulating water from the hot water delivery line through the cold water delivery line and into the hot water source.

9. The hot water recovery system according to claim 8 further comprising manual switch means, connected to said control means, for causing the control means to turn on the pump means.

10. The hot water recovery system according to claim 8 further comprising flow detection means, disposed in said hot water delivery line and connected to said control means, for causing the control means to turn on the pump means.

11. The hot water recovery system according to claim 8 wherein said temperature sensor means is disposed in a water line connecting the hot water delivery line and the pump means.

12. The hot water recovery system according to claim 11 wherein said temperature sensor means comprises means for detecting a selected water temperature and in response thereto causing the control means to stop the pump means.

13. The hot water recovery system according to claim 11 wherein said temperature sensor means comprises means for detecting a temperature increase and in response thereto causing the control means to stop the pump means.

14. The hot water recovery system according to claim 13 wherein said pump means comprises a positive displacement pump for preventing backflow therethrough when the pump means is stopped.

* * * * *

UNITED STATES PATENT AND TRADEMARK OFFICE
CERTIFICATE OF CORRECTION

PATENT NO. : 5,277,219
DATED : January 11, 1994
INVENTOR(S) : William J. Lund

It is certified that error appears in the above-indentified patent and that said Letters Patent is hereby corrected as shown below:

At column 5, line 34, insert as Claim 8:

8. A hot water recovery system for a plumbing system having seperate hot water and cold water delivery lines connected to at least one plumbing fixture, said hot water delivery line being connected to a hot water source disposed remotely from the plumbing fixture and said cold water delivery line being connected to a cold water source and said hot water source, said hot water recovery system comprising:

UNITED STATES PATENT AND TRADEMARK OFFICE
CERTIFICATE OF CORRECTION

PATENT NO. : 5,277,219
DATED : January 11, 1994
INVENTOR(S) : William J. Lund

It is certified that error appears in the above-indentified patent and that said Letters Patent is hereby corrected as shown below:

> pump means, adapted for interconnection between said hot and cold water delivery lines, at a point remote from said hot water source, for circulating water from the hot water delivery line through the cold water delivery line and into the hot water source;
>
> control means for causing the pump means to circulate water from the hot water line into the cold water line, proximate said plumbing fixture, and back to the hot water source when a hot water valve on said plumbing fixture is turned on; and
>
> temperature sensor means, connected to said control means for causing said control means to stop the pump means to prevent heated water from being circulated through the cold water delivery line.

Signed and Sealed this

Thirty-first Day of May, 1994

Attest:

BRUCE LEHMAN

Attesting Officer    Commissioner of Patents and Trademarks